United States Patent [19]
Hinton et al.

[11] Patent Number: 5,842,036
[45] Date of Patent: Nov. 24, 1998

[54] CIRCUIT AND METHOD FOR SCHEDULING INSTRUCTIONS BY PREDICTING FUTURE AVAILABILITY OF RESOURCES REQUIRED FOR EXECUTION

[75] Inventors: Glenn J. Hinton, Portland; Robert W. Martell; Michael A. Fetterman, both of Hillsboro; David B. Papworth, Beaverton; James L. Schwartz, Portland, all of Oreg.

[73] Assignee: Intel Corporation, Santa Clara, Calif.

[21] Appl. No.: 954,444

[22] Filed: Oct. 20, 1997

Related U.S. Application Data

[60] Continuation of Ser. No. 634,692, Apr. 18, 1996, abandoned, which is a division of Ser. No. 293,388, Aug. 19, 1994, Pat. No. 5,555,432.

[51] Int. Cl.⁶ ........................................................ G06F 9/38
[52] U.S. Cl. .................... 395/800.23; 395/392; 395/393; 395/394
[58] Field of Search ..................................... 395/392, 391, 395/393, 394, 382, 800.23, 800.24

[56] References Cited

U.S. PATENT DOCUMENTS

| | | | |
|---|---|---|---|
| 5,488,729 | 1/1996 | Vegesna et al. | 395/800 |
| 5,546,597 | 8/1996 | Martell et al. | 395/800 |
| 5,553,256 | 9/1996 | Fettermen et al. | 395/375 |
| 5,604,878 | 2/1997 | Colwell et al. | 395/353 |

FOREIGN PATENT DOCUMENTS 9301546  1/1993  WIPO .

*Primary Examiner*—Larry D. Donaghue
*Attorney, Agent, or Firm*—Blakely, Sokoloff, Taylor & Zafman

[57] ABSTRACT

An out-of-order execution processor comprising an execution unit, a storage unit and a scheduler is disclosed. The storage unit stores instructions awaiting availability of resources required for execution. The scheduler periodically determines whether resources required for executing each instruction are available, and if so, dispatches that instruction to the execution unit. The execution unit indicates future availability of hardware resources such as functional units and write back ports a number of clock cycles before actual availability of the hardware resources. The scheduler determines availability of resources required for execution of an instruction based on the indication of future availability of the hardware resources, and dispatched the instruction for execution. The out-of-order execution processor also includes means to determine future completion of execution of source instructions a number of clock cycles before actual completion of execution. The scheduler dispatches for execution a data-dependent instruction that requires an execution result of one of such source instructions for an operand. Once the execution result of the source instruction is available, a bypass multiplexor bypasses the execution result into the dispatched data-dependent instruction. The bypass multiplexor sends the data dependent instruction with fully assembled operands to the execution unit for execution.

7 Claims, 13 Drawing Sheets

| INSTRUCTION VALID | OPERATION CODE | INSTRUCTION TAG | FIELDS CORRESPONDING TO OPERAND 1 | | | | FIELDS CORRESPONDING TO OPERAND 2 | | | | |
|---|---|---|---|---|---|---|---|---|---|---|---|
| | | | TAG | VALID | OPERAND | 2 CLOCK PRELIMINARY VALID | 1 CLOCK PRELIMINARY VALID | TAG | VALID | OPERAND | 2 CLOCK PRELIMINARY VALID | 1 CLOCK PRELIMINARY VALID |
| 310 | 320 | 330 | 341 | 342 | 343 | 344 | 345 | 351 | 352 | 353 | 354 | 355 |
| 0   1 | 7 | 13 | 19 | 20 | 106 | 107 | 108 | 114 | 115 | 201 | 202 | 203 |

CIRCUIT AND METHOD FOR SCHEDULING INSTRUCTIONS BY PREDICTING FUTURE AVAILABILITY OF RESOURCES REQUIRED FOR EXECUTION

This is a continuation of application Ser. No. 08/634,692, filed Apr. 18, 1996, now abandoned, which is a divisional of application Ser. No. 08/293,388, filed Aug. 19, 1994 now U.S. Pat. No. 5,555,432.

FIELD OF INVENTION

The present invention pertains to the field of computer architecture. More specifically, this invention relates to a circuit and method for scheduling instructions for execution in a computer processor incorporating an out-of-order execution pipeline.

BACKGROUND

Typical prior computer systems implement in-order execution pipelines. An in-order execution processor usually fetches an instruction stream from a memory and executes each instruction in the instruction stream according to a sequential program order. Accordingly, an instruction in an in-order execution processor generally begins execution after completion of execution of prior instructions in the program order.

Hence, a delay in completion of execution of an earlier instruction in the program order usually delays the beginning of execution of a later instruction. Such delay in completion has several causes. For example, the earlier instruction may need to wait for an operand to be fetched from an external storage device. The resulting delay in the beginning of execution of the later instruction similarly delays the beginning of execution of even later instructions in the program order. As a consequence, the instruction execution performance of such in-order execution processors is generally limited.

A processor may incorporate an out-of-order execution pipeline to increase the instruction execution performance. Out-of-order execution processors typically execute instructions according to the availability of the resources required to execute each instruction. Such out-of-order execution processors typically execute later instructions in the sequential program order that have all the resources required for execution available ahead of earlier instructions that are awaiting availability of the corresponding required resources. The instruction execution performance of such out-of-order execution processors is enhanced over in-order processors because a delay in the completion of earlier instructions in the program order typically does not delay the beginning of execution of later instructions in the program order.

An out-of-order execution processor typically buffers the fetched instructions, determines whether each buffered instruction has the resources required for execution available, and then dispatches each instruction for execution as the resources required for execution are available. The resources required to execute an instruction usually include operands of the instruction and hardware execution resources. Instructions having such required resources available are said to be ready for execution.

Typically, the operands required to execute an instruction are available as immediate data in the instruction stream or as an execution result of another instruction. For example, in an instruction stream comprising instructions 101, 102, wherein Instruction 101: A=5+3; and
Instruction 102: B=A*9,
instruction 101 has both operands available in the instruction stream because instruction 101 includes constant values 5 and 3 as operands.

On the other hand, the operand 'A' for instruction 102 is the execution result of instruction 101. An instruction, such as 102, which requires the execution result of another instruction (101 in the above example) for an operand is referred to as a data dependent instruction. An instruction such as 101 that provides an operand for a data dependent instruction (102 in the above example) is referred to as a source instruction.

In an out-of-order execution processor, a latency typically exists between the time the execution result of a source instruction is generated and the time a corresponding data-dependent instruction begins execution. Such latency typically includes time for providing the execution result to the data dependent instruction, time for determining whether the data-dependent instruction is ready for execution, and time for dispatching the data dependent instruction to the appropriate execution resource. Unfortunately, such latencies usually decrease the instruction throughput performance of such an out-of-order execution processor.

The resources required for executing an instruction include an execution resource specified by an operation code of the instruction. For example, an integer addition instruction requires an execution resource that performs integer addition operations.

Typically, the required execution resource for an instruction may not be available to accept the instruction for execution at the time the required operands are available. For example, a non-pipelined execution resource is generally not available to accept additional instructions while executing another instruction.

In addition, a latency typically exists between the time an execution resource becomes available and the time an instruction requiring that execution resource begins execution. Such latency usually includes time for determining the availability of the execution resource, time for determining whether the instruction is ready for execution, and time for dispatching the instruction to the execution resource. Unfortunately, such latency causes the execution resource to remain idle after becoming available. Such idle time reduces the instruction throughput performance of the processor because the execution resources are not completely utilized.

In addition, such an out-of-order execution processor typically resolves conflicts among instructions for hardware resources other than execution resources in order to determine whether an instruction is ready for execution. Such conflicts arise, for example, if more than one instruction requires a resource that cannot process multiple instructions at the same time.

For example, an out-of-order execution processor usually includes a write back port shared by multiple execution resources. The execution resources generally provide execution results to the buffered data-dependent instructions using the write back port. Such write-back port typically permits transfer of only one execution result during each clock cycle. Unfortunately, a conflict usually arises for the write back port when more than one execution resource generates an execution result for a data dependent instruction at the same time.

SUMMARY AND OBJECTS OF THE INVENTION

One object of the present invention is to increase the instruction throughput performance of an out-of-order execution processor.

Another object of the present invention is to minimize the delay between completion of execution of a source instruction and the beginning of execution of a corresponding data dependent instruction.

It is a further object of the present invention to determine readiness of a data dependent instruction based on future availability of an execution result of a corresponding source instruction.

It is also an object of the present invention to provide the execution results of source instructions to the dispatched data dependent instruction based on future availability of the execution result.

It is a further object of the present invention to minimize the latency between the time an execution resource required for executing an instruction is available and the time the execution resource begins executing the instruction.

It is also an object of the present invention to determine readiness of an instruction based on future availability of an execution resource.

It is another object of the present invention to resolve conflicts among instructions for shared resources.

It is an object of the present invention to resolve conflicts for a write back port shared by multiple execution resources.

These and other objects of the present invention are provided by a processor comprising at least one execution resource that indicates future availability to accept additional instructions before completion of execution of a previously dispatched instruction.

The processor further comprises a storage unit for buffering instructions awaiting availability of resources required for execution. The storage unit stores the waiting instructions until each instruction is ready for execution.

The processor includes a scheduler that examines each waiting instruction in the storage unit to determine whether the execution resource that has indicated future availability is required to execute the waiting instruction. If so, the scheduler dispatches the waiting instruction to the execution resource for execution so as to minimize latency between a time the execution resource completes executing a prior instruction and a time the execution resource begins executing the waiting instruction.

The execution resource indicates future availability to receive additional instructions a number of dock cycles prior to completion of execution of the prior dispatched instruction, wherein the scheduler requires that number of clock cycles to determine whether a waiting instruction is ready for execution and to dispatch the ready instruction to the execution resource.

The processor includes means to indicate future availability of an execution result corresponding to a source instruction. The scheduler determines whether the execution result provides an operand to a data dependent instruction. If so, the scheduler dispatches the data dependent instruction to the execution resource.

The processor further includes a means to receive the execution result of the source instruction and bypass the execution result into the dispatched data dependent instruction. The data dependent instruction has fully assembled operands when the data dependent instruction is received at the execution resource. The future availability of the execution result is indicated so as to minimize a delay between generation of the execution result and the beginning of execution of the data dependent instruction.

The processor further includes a write back port shared by at least two execution resources to transfer execution results generated by the execution resources to a result buffer. The write back port permits transfer of only one execution result during a given clock cycle.

In order to avoid a conflict between the execution resources for the write back port, each execution resource indicates a number of clock cycles in which the execution resource will complete execution of a currently executing instruction. The scheduler determines an execution time of each waiting instruction based on the operation code of the instruction.

The scheduler determines whether the write back port will be available to transfer the execution result of the waiting instruction according to the execution time of the instruction and the number of clock cycles indicated by the execution resources sharing the write back port.

BRIEF DESCRIPTION OF THE DRAWINGS

The present invention is illustrated by way of example and not limitations in the figures of the accompanying drawings in which like references indicate similar elements, and in which:

FIG. 6 illustrates the format of an entry corresponding to an instruction in the storage unit;

DETAILED DESCRIPTION

Figure 1:
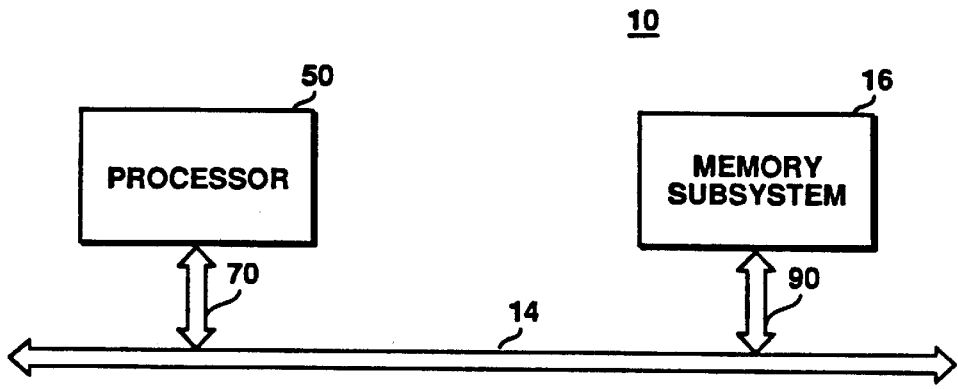
FIG. 1 illustrates a computer system comprising a processor, and a memory subsystem.

FIG. 1 illustrates a computer system 10 comprising a processor 50 and a memory subsystem 16. The processor 50 fetches a stream of architectural operations from the memory subsystem 16 over a host bus 14 and executes each architectural operation.

Figure 2:
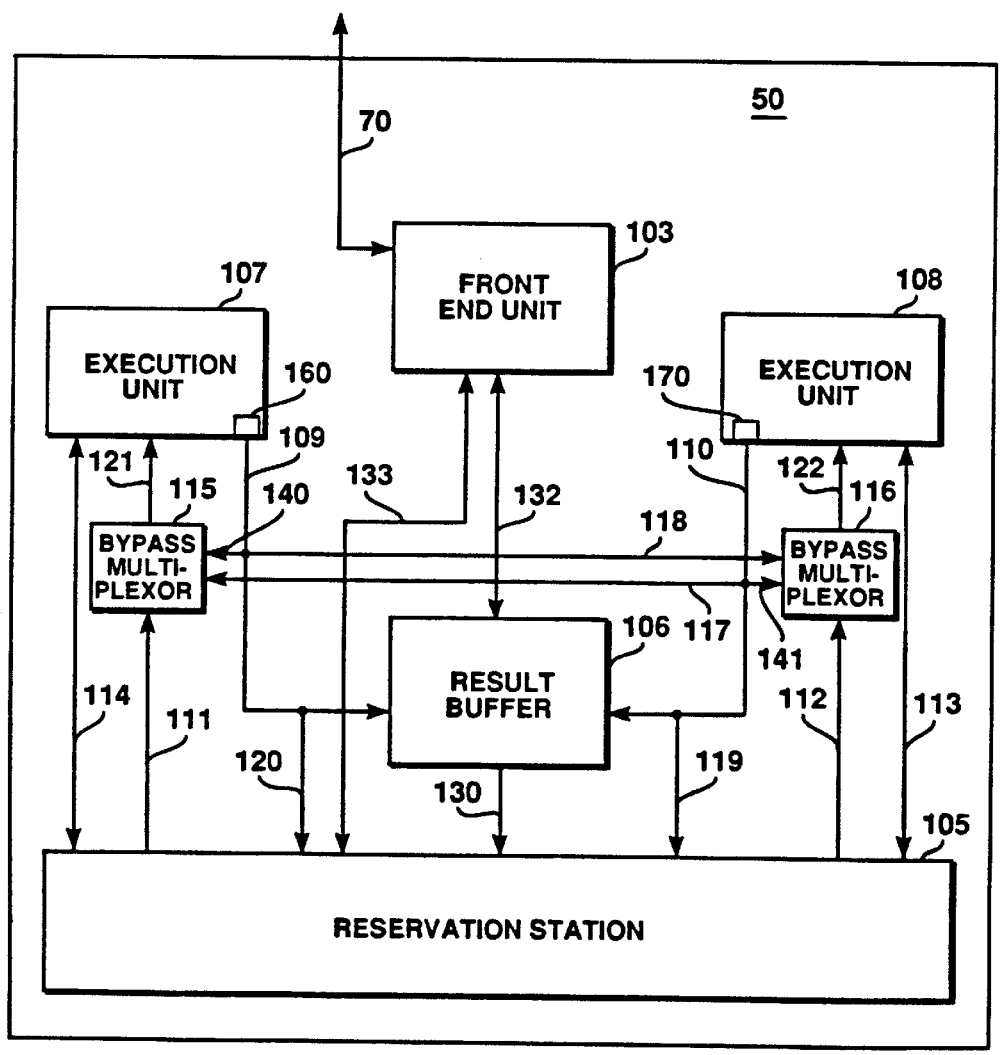
FIG. 2 illustrates the processor which comprises a front end unit, a pair of execution units, a reservation station, a pair of bypass multiplexors, and a result buffer.

FIG. 2 illustrates the processor 50 for one embodiment. The processor 50 comprises a front end unit 103, a pair of execution units 107, 108, a reservation station 105, a result buffer 106, and a pair of bypass multiplexors 115, 116. The front end unit 103 fetches the architectural operations, translates each architectural operation into one or more instructions, and issues a stream of instructions to the reservation station 105. The reservation station 105 stores the instructions, determines whether the resources required to execute each instruction are available and dispatches each instruction with available resources to one of the execution units 107, 108. The execution units 107, 108 execute instructions and transfer execution results to the result buffer 106 through the write back port 160, 170 respectively. The result buffer 106 comprises a set of physical registers and stores an execution result in each physical register.

The front end unit 103 fetches architectural operations from the memory subsystem 16 over an operations fetch bus 70, translates each architectural operation into one or more instructions, and issues the instructions over an instruction issue bus 133. The instructions corresponding to an architectural operation perform the same function as the architectural operation.

For one embodiment, the architectural operations fetched by the front end unit 103 comprise Intel Architecture Microprocessor Operations. The Intel Architecture operations operate on a set of architectural registers including an EAX register, an EBX register, an ECX register, and an EDX register as well as floating point registers. Each architectural operation specifies architectural registers to identify the operands and a destination architectural register to store the corresponding execution result.

To translate the architectural operations, the front end unit 103 breaks each architectural operation into an equivalent set of one or more instructions. The resulting instructions are reduced instruction set operations. The front end unit 103 also maps the architectural registers into a larger set of physical registers in the reorder buffer 106.

To perform the mapping, the front end unit 103 assigns a physical register in the result buffer 106 to each architectural destination register, and maps architecture register operands to the corresponding physical register. Each physical register is uniquely identified by a result tag. Accordingly, the front end unit 103 associates the result tag of a physical register to the assigned destination register and corresponding operands. The following example illustrates the instructions resulting from the translation function in the front end unit 103.

EXAMPLE 1

| Instruction Number | Operation | Result Tag Of Destination Register | Operand 1- Result Tag | Operand 2- Result Tag |
|---|---|---|---|---|
| 0: | Mul | 15 | 17–# | 19–# |
| 1: | Add | 20 | *–15 | 18–# |
| 2: | Sub | 21 | *–15 | *–20 |

In example 1, instruction 0 is an operation to multiply two constant values 17 and 19. The front end unit 103 assigns a result tag of 15 to destination physical register of instruction 0. Since operands of instruction 1 are constant values, the front end unit 103 does not associate a result tag to the operands of instruction 0 (indicated by # in the corresponding result tag fields). Execution result of instruction 0 is operand 1 of instructions 1 and 2. Accordingly, the front end unit 103 associates result tag 15 (result tag of destination register of instruction 0) with operand 1 of instructions 1 and 2. Similarly, the result tag (20) of destination register of instruction 1 is associated with operand 2 of instruction 2 because the execution result of instruction 1 is operand 2 of instruction 2.

The data dependent operands 1 and 2 of instruction 2, and operand 1 of instruction 1 are not available when the instruction is in the front end unit 103 (indicated by a*). After the execution result of instruction 0 is generated in one of the execution units 107 or 108, the execution result of instruction 0 is bypassed into instructions 1 and 2. Execution results are bypassed into the corresponding instructions either in the reservation station 105 or in one of the bypass multiplexors 115, 116. Instructions 1 and 2 will each have respective operand 1 available after the execution result of instruction 0 is bypassed into instructions 1 and 2 respectively. Similarly, instruction 2 will have operand 2 available after execution result of instruction 1 is bypassed into instruction 2.

The front end unit 103 transfers each instruction (including result tags of operands and destination physical register) to the reservation station 105 over an instruction issue bus 133. In parallel, the front end unit 103 sends the result tag associated with each of the data dependent operands over a result request bus 132 to the result buffer 106. In the case of example 1, the front end unit 103 sends a result tag of 15 corresponding to operand 1 of instruction 1 on the result request bus 132. Similarly, the front end unit 103 sends result tags of 15 and 20 corresponding to operands 1 and 2 respectively of instruction 2.

The result tag on the result request bus 132 causes the result buffer 106 to transfer the data stored in the physical register specified by the result tag over a result delivery bus 130. The data transferred includes a valid bit which indicates whether the execution result corresponding to the physical register is available (i.e., the execution result has been generated in an execution unit 107 or 108, and stored in the physical register). If the valid bit indicates that the execution result is available, the data accompanying the valid bit represents the execution result corresponding to the data dependent operand. The reservation station 105 stores the data received over the result delivery bus with the corresponding instruction. The reservation station 105 indicates whether the operand is available according to the valid bit received.

The execution unit 107 receives at most one instruction during each clock cycle over an assembled instruction dispatch bus 121 from the bypass multiplexor 115. The execution unit 107 executes the received instructions concurrently. For example, the execution unit 107 executes floating point multiplication instructions and integer add operations concurrently. The execution unit 107 writes back the execution results and result tags of the destination physical registers through the write back port 160. The write back port 160 permits transfer of only one execution result per clock cycle.

The execution unit 107 sends busy signals on a control bus 114 to indicate non-availability to accept additional instructions of different types. For example, if the execution unit 107 cannot accept additional floating point divide instructions for execution, the execution unit 107 sends a busy signal over the control bus 114 corresponding to floating point divide instructions. The busy signal prevents the reservation station 105 from scheduling additional floating point divide instructions for execution.

The execution unit 107 sends inhibit signals corresponding to different execution times over the control bus 114 to prevent conflict for the write back port 160. A conflict for the write back port 160 would occur if more than one instruction completes execution during the same clock cycle in the execution unit 107. Multiple instructions can complete execution during the same clock cycle because the execution unit 107 executes more than one instruction concurrently, and these instructions have different execution times depending on the operation code. For one embodiment, an instruction having an operation code specifying an integer addition or subtraction operation executes in one clock cycle. A floating point multiplication operation executes in five clock cycles. If an integer operation is scheduled for execution four clock cycles after a floating point multiplication operation, the two instructions would complete execution during the same clock cycle, thereby causing a conflict for the write back port 160.

During each clock cycle, the execution unit 107 sends an inhibit signal corresponding to an execution time on the control bus 114 if an instruction in the reservation station 105 with that execution time would complete execution during the same clock cycle as an already executing instruction in the execution unit 107. In response, the reservation station 105 does not schedule additional instructions with corresponding execution time to the execution unit 107.

During each clock cycle, the execution unit 107 indicates future availability of execution results of currently executing instructions by sending a two clock preliminary valid signal over the control bus 114. The execution unit 107 sends the two clock preliminary valid signal by predicting the completion of executing instructions (and ensuing write-back of the execution result) during each clock cycle. The two clock preliminary valid signal causes the reservation station 105 to schedule instructions that have all the required resources for execution other than an operand corresponding to the execution result indicated. In example 1, one of the execution units 107 or 108 executing instruction 0 predicts completion of instruction 0 and sends a two clock preliminary valid signal to the reservation station 105. The reservation station 105 schedules instruction 1 if instruction 1 has all the required resources for execution except the execution result of the predicted instruction (i.e. instruction 0).

Similarly, the execution unit 108 executes more than one instruction concurrently and writes back the execution results through the write back port 170. The execution unit 108 sends busy signals corresponding to the types of instructions that the execution unit 108 cannot accept for execution to the reservation station 105. The execution unit 108 sends inhibit signals over the control bus 113 to the reservation station 105 to resolve conflict for the write back port 170. The execution unit 108 also sends two clock preliminary valid signals over the control bus 113 to the reservation station 105 to indicate future availability of execution results (i.e. during write-back stage) of nearly completed instructions.

The reservation station 105 receives instructions on the instruction issue bus 133 from the front end unit 103. The instructions include the operation code, result tags of operands and destination physical register, and operands. The reservation station 105 comprises multiple storage entries, and stores a received instruction in each entry.

In parallel to receiving each instruction, the reservation station 105 receives data corresponding to each data dependent operand of the instruction from the result buffer 106 over the result delivery bus 130. The received data includes a valid bit that indicates whether the execution result of the source instruction corresponding to the data dependent operand is available. The received data also includes bits that correspond to the execution result of the source instruction. If the valid bit indicates that the execution result is available, the bits corresponding to execution result represent valid data. The reservation station 105 assembles the received data (including execution result) with the corresponding instruction received in parallel. The reservation station 105 stores an operand valid bit according to the valid bit in the received data.

The reservation station 105 receives execution results and the corresponding result tags over snooping buses 119, 120 from the execution units 107, 108 respectively. The reservation station 105 compares each received result tag with the result tag associated with all the operands stored in the reservation station 105. If a match is detected, the reservation station 105 determines that the received execution result corresponds to the operand corresponding to the matched result tags. Accordingly, the reservation station 105 bypasses the execution result into the operands that correspond to the matched result tags.

The reservation station 105 schedules instructions that are ready for execution. An instruction is determined ready for execution if each resource required for execution of the instruction will be available when the resource is required. The resources required to execute an instruction include the operands, the execution unit 107 or 108, the write-back port 160 or 170 corresponding to the execution unit 107 or 108 respectively. The reservation station 105 determines the availability of resources for each instruction based on signals on control buses 113, 114 and availability of the corresponding operands.

The reservation station 105 determines an instruction is ready based on indication of future availability of execution results. The reservation station 105 receives the two clock preliminary valid signals with result tags on the control buses 114, 113 from the execution units 107, 108 respectively. A two clock preliminary valid signal indicates that the execution unit 107 or 108 has determined the future availability of execution result corresponding to the received result tag. The execution result is available because the execution result is written back on the write-back bus 109 or 110.

The reservation station 105 compares each received result tag with the result tag of the data dependent operands stored in the reservation station 105. If a match is detected, the reservation station 105 determines ready an instruction with matched operands provided all the other resources required to execute the instruction will also be available when required.

The reservation station 105 dispatches the scheduled ready instructions over a dispatch bus 111 or 112 depending on whether each instruction requires execution unit 107 or 108 respectively. In one embodiment, the front end unit 103 assigns one of the execution units 107 or 108 to each of the instructions in an earlier pipeline stage. The reservation station 105 dispatches ready instructions to one of the execution units 107 or 108 according to the determination.

The reservation station 105 controls the operation of the bypass multiplexors 115, 116 so as to ensure that the bypass multiplexors 115, 116 dispatch instructions with fully assembled operands to the respective execution unit 107, 108. If the instructions dispatched from the reservation station 105 have fully assembled operands, the reservation station 105 causes the multiplexor 115, 116 to send the received instructions without any bypass into the instruction.

In the case of dispatching instructions to bypass multiplexors 115, 116 without an operand assembled, the reservation station 105 controls the operation of the bypass multiplexors 115, 116 to bypass the execution result corresponding to the operand into the instruction. The reservation station 105 dispatches each instruction such that the arrival of the instruction at the bypass multiplexor 115 or 116 is synchronized with availability of the execution results on the write-back bus 109 or 110.

If the reservation station 105 dispatches the instruction without an operand to the bypass multiplexor 116, the reservation station 105 causes the bypass multiplexor 116 to bypass data from the snooping bus 118 or 141 according to the execution unit 107 or 108 that generates the predicted execution result corresponding to the unavailable operand.

For example, assume that the execution unit 107 predicts the future availability of an execution result and that the reservation station 105 determines that an instruction without an operand assembled is ready based on the prediction. Also assume that the instruction without the operand is assigned to execute on execution unit 108. Accordingly, the reservation station 105 dispatches the instruction to the multiplexor 116 such that the instruction arrives during the same clock cycle as when the execution unit 107 writes back the predicted execution result on the write back bus 109. The reservation station 105 controls the operation of the bypass multiplexor 116 such that the bypass multiplexor 116 bypasses data (i.e. predicted execution result) from the snooping bus 118 (which couples to the write back bus 140) into the instruction. As a result, the bypassed instruction has fully assembled operands. Similarly, the reservation station 105 causes the bypass multiplexor 116 to bypass from the snooping bus 141 if the execution unit 108 generates the predicted execution result.

Similarly, the bypass multiplexor 115 receives each ready instruction and operates on the instruction under the control of the reservation station 105. If the ready instruction does not have an operand available, the reservation station 105 causes the bypass multiplexor 115 to bypass execution result corresponding to the unavailable operand into the instruction from the snooping bus 140 or 117. If the ready instruction has fully assembled operands, the reservation station 105 causes the bypass multiplexor 115 to transfer the instruction to the execution unit 107 without bypass.

Figure 3:
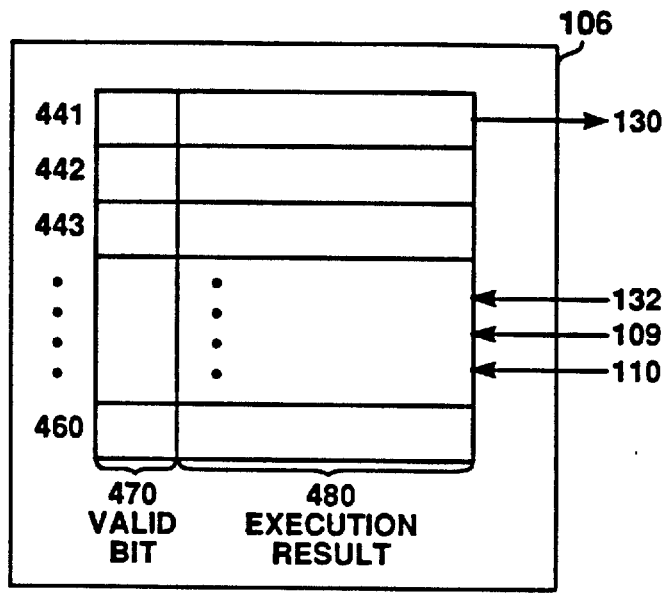
FIG. 3 illustrates the result buffer comprising multiple physical registers.

FIG. 3 illustrates the result buffer 106 for one embodiment. The result buffer 106 comprises twenty physical registers (441–460) with each register identified by a unique result tag. Each physical register 441–460 comprises of two fields, a valid bit 470 and an execution result field 480.

The execution result field 480 stores the execution result corresponding to the physical register once the execution result is available. The result buffer 106 receives the execution result and the result tag of each instruction that has completed execution from the execution units 107, 108 over the write back buses 109, 110 respectively. The result buffer 106 stores each execution result in the physical register specified by the corresponding result tag.

The valid bit 470 specifies whether the corresponding physical register 441–460 has a valid execution result in the execution result field 480. The front end unit 103 sets the valid bit 470 to zero each time the corresponding physical register is assigned to an architectural destination register. The result buffer 106 sets the valid bit 470 to one once the result buffer 106 stores the corresponding execution result received on the write back bus 109 or 108.

The result buffer 106 receives result tags on the result request bus 132 from the front end unit 103. In response, the result buffer 106 sends the valid bit and execution result in the physical register 441–460 specified by the received result tag to the reservation station 105 over the result delivery bus 130.

Figure 4:
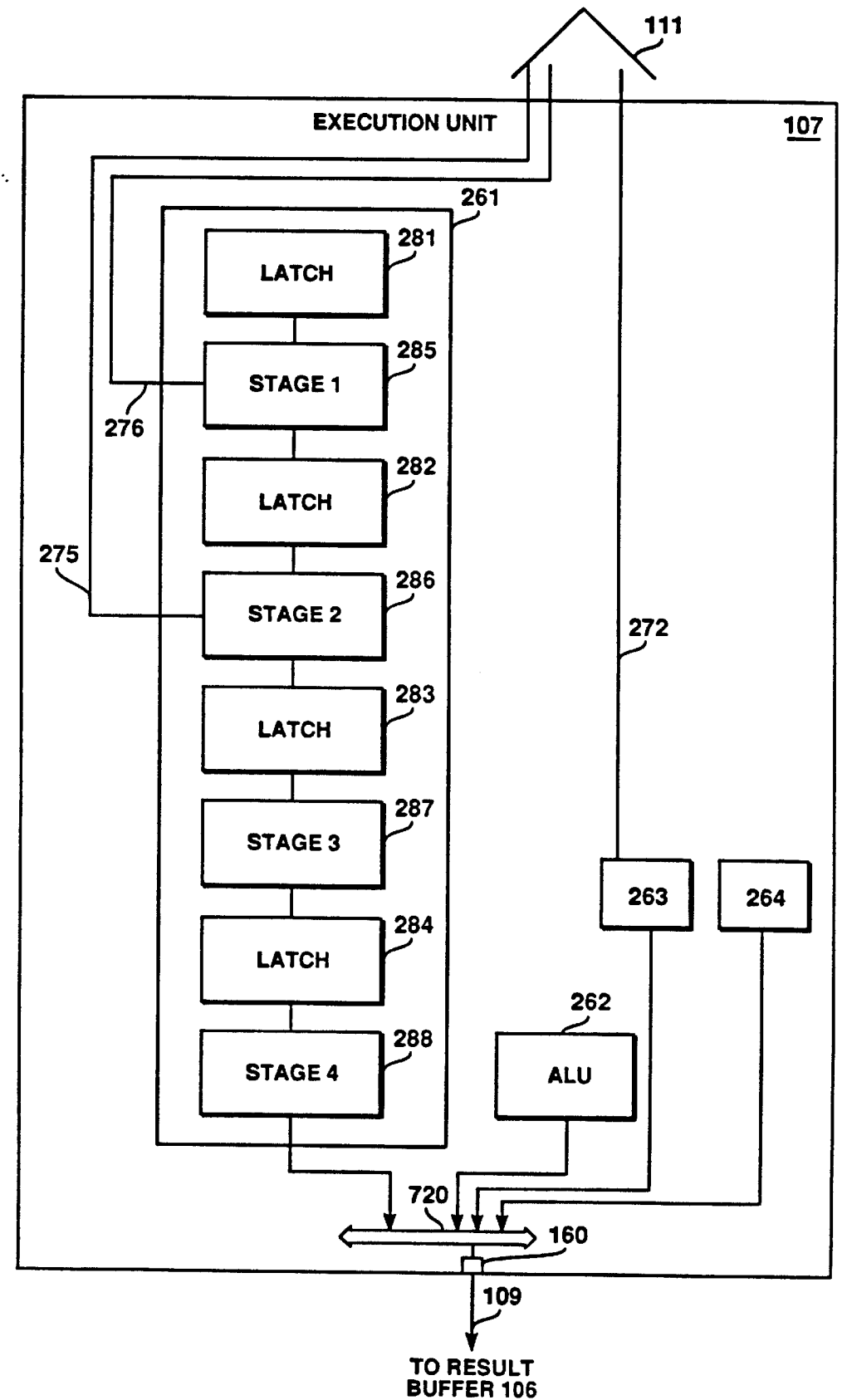
FIG. 4 illustrates the execution unit comprising multiple functional units.

FIG. 4 illustrates the execution unit 107 for one embodiment. The execution unit 107 comprises a set of functional units 261–264. The functional units 261–264 execute instructions concurrently and write back the execution results and corresponding result tags to the result buffer 106 through the write back port 160. The write back port 160 allows transfer of only one execution result during each clock cycle.

The functional unit 261 executes floating point multiplication operations. The functional unit 261 comprises pipelined stages 285–288. The execution of each floating point multiplication instruction requires four clock cycles corresponding to the four stages 285–288.

The functional unit 261 sends an inhibit signal by asserting a one clock instruction inhibit signal line 275 of the control bus 114 to prevent the reservation station 105 from scheduling instructions with execution time of one clock cycle. During each clock cycle, the functional unit 261 asserts the one clock instruction inhibit signal line 275 if the stage 286 is executing an instruction. The instruction executing in the stage 286 requires two additional clock cycles corresponding to the stages 287 and 288 to complete execution. If the reservation station 105 schedules an instruction with execution time of one clock cycle during the same clock cycle as when the currently executing instruction is in stage 286, both the instructions would complete execution during the same clock cycle resulting in conflict for the write back port 160.

The reservation station 105 does not schedule instructions with execution time of one clock cycle to the execution unit 107 if the one clock instruction inhibit signal line 275 is asserted. The functional unit 261 will have exclusive access to the write back port 160 after completion of execution of instruction in the stage 286. Consequently, a conflict for the write back port 160 is avoided.

Similarly, the functional unit 261 asserts a two clock instruction inhibit signal line 276 to prevent the reservation station 105 from scheduling instructions with execution time of two clock cycle. The reservation station 205 does not schedule instructions with execution time of two clock cycles to the execution unit 107 if the two clock instruction inhibit signal line 276 is asserted. The inhibit lines 275 and 276 are implemented in the control bus 114.

The functional unit 263 is a floating point divide unit with a variable execution time depending on the precision desired. The floating point unit 263 is not pipelined. Consequently, the functional unit 263 does not accept additional instructions before completing execution of an executing instruction.

The functional unit 263 indicates non-availability to accept additional instructions by asserting the busy line 272. The functional unit 263 deasserts two clock cycles prior to completing execution of an instruction. The functional unit 263 also deasserts the busy line 272 if the functional unit 263 is not executing instructions.

In response to the assertion of the busy signal line 272, the reservation station 105 does not schedule floating point divide instructions to the execution unit 107. The reservation station 105 ensures that the busy signal line 272 is deasserted before sending a floating point divide instruction to the execution unit 107. The busy line 272 is also implemented in the control bus 114.

The functional unit 262 performs integer arithmetic operations. The functional unit 262 executes integer addition and integer subtraction operations in one clock cycle. The functional unit 264 executes floating point add and floating point subtraction instructions with an execution time of three clock cycles for each instruction.

Figure 5:
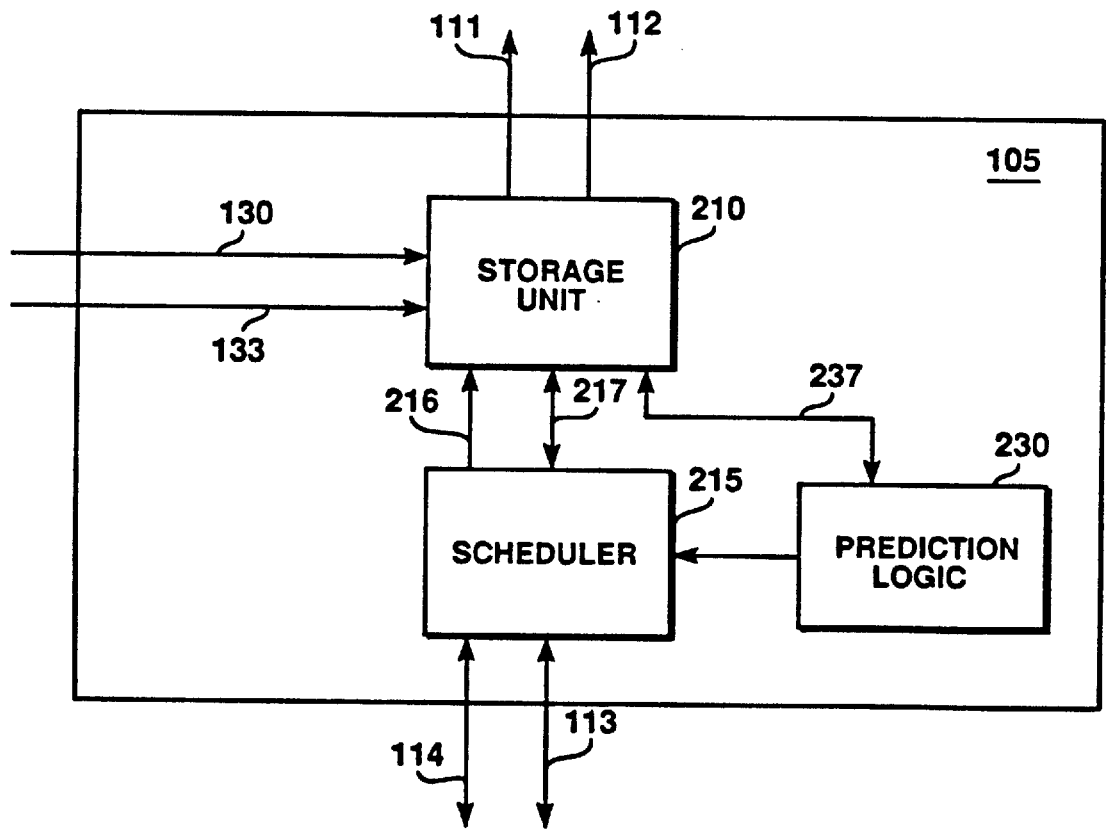
FIG. 5 illustrates the reservation station comprising a storage unit, a scheduler, and prediction logic.

FIG. 5 illustrates the reservation station 105 for one embodiment. The reservation station 105 comprises a storage unit 210, a scheduler 215, and prediction logic 230. The storage unit 210 stores the instructions received from the front end unit 103 over the instruction issue bus 133. The scheduler 215 determines whether each stored instruction is ready for execution and dispatches the ready instructions in the storage unit 210 to one of the bypass multiplexors 115, 116 by sending a dispatch signal over a dispatch signal bus 216. The prediction logic 230 predicts availability of execution results of instructions that are scheduled for execution.

The prediction logic 230 determines future availability of execution results by examining ready instructions, and sends a one clock preliminary valid signal to the storage unit 210 accordingly. The prediction logic 230 examines the operation code of ready instructions that are ready for dispatch in each clock cycle. If the execution time of the ready instruction is one clock cycle ("one clock instruction"), the prediction logic 230 sends a one clock preliminary valid signal with the result tag of the one clock instruction to the storage unit 210 over the bus 231. The one clock preliminary valid signal indicates that the corresponding execution result will be written back on the write back bus 109 or 110 in two clock cycles.

The one clock preliminary valid signal causes the scheduler 215 to schedule a data dependent instruction for execution if all the resources, other than the operand corresponding to the execution result, are available. The scheduler 215 determines a data dependent instruction is ready one clock cycle (i.e. back-to-back scheduling) after determining the one-clock-instruction is ready. The one clock lag permits the execution result of the one-clock-instruction to be available at the bypass multiplexors 115, 116 during the same clock cycle as when the data dependent instruction is received at the bypass multiplexor 115, 116.

The storage unit 210 receives instructions over the instruction issue bus 133 from the front end unit 103, and stores the received instructions. In parallel, the storage unit 210 receives data corresponding to each data dependent operand over the result delivery bus 130 from the result buffer 106. The data comprises an execution result and a valid data bit. The storage unit 210 stores the received data with the corresponding instruction received in parallel. The valid bit is stored with the instruction so as to indicate whether the received execution result is valid. If the received execution result is valid, the storage unit 210 indicates that the operand is available.

The storage unit 210 also receives execution results and corresponding result tags of instructions that have completed execution over the snooping buses 119 and 120. The storage unit 210 compares each received result tag with the result tags associated with the data dependent operands in the storage unit 210. If a match is detected, the storage unit 210 determines that the received execution result is the operand associated with each of the matched tags. The storage unit 210 bypasses the newly available operand into the corresponding instructions.

Each instruction waits in the storage unit 210 until the scheduler 215 schedules the instruction for dispatch. The scheduler 215 schedules the instruction for dispatch by determining whether the required resources for execution will be available when required. The storage unit 210 dispatches each instruction on the dispatch bus 111 or 112 according to the execution unit 107 or 108 that is assigned to execute the instruction.

The scheduler 215 determines whether an instruction is ready for execution by examining the corresponding entry in the storage unit 210 and the signals on the control buses 113, 114. An instruction is ready for execution if each of the required resources to execute the instruction will be available at the time the resource is required. The resources are not required to be available at the time the scheduler 215 determines the instruction is ready. The resources required for executing an instruction include the operands of the instruction, one of the functional units 261–264 (functional units in the execution unit 108 not shown in drawings) in the execution unit 107 or 108 according to the operation code, the write back port 160 or 170 in the corresponding execution unit 107 or 108, and the dispatch bus 111 or 112 corresponding to the execution unit 107 or 108.

The operands for executing an instruction are required when the instruction is processed in the execution unit 107, 108. Operands that are not data dependent are available when the operands are transferred from the front end unit 103 to the reservation station 105. Accordingly, the scheduler 215 determines that the operands that are not data dependent are available. The scheduler determines data dependent operands are available if the storage unit 210 has bypassed the execution result corresponding to the operand into the instruction.

The scheduler 215 determines that a data dependent operand will be available by the time the instruction comprising the data dependent operand reaches the execution unit 107 or 108 if the storage unit 210 has received a two clock preliminary valid signal or a one clock preliminary valid signal with the result tag associated with the destination register of the data dependent operand. With respect to the instructions in example 1, assume that instruction 1 is waiting in the storage unit 210 to be scheduled for execution. Also assume that instruction 0 is executing in the execution unit 107 and that the execution unit 107 has sent a two clock preliminary valid signal with a result tag 15 (result tag of destination register of instruction 0) to the storage unit 210 over the control bus 114. Since operand 1 of instruction 1 is the execution result of instruction 0 and since instruction 0 has not completed execution, the operand 1 of instruction 1 is not available. The scheduler 215 determines operand 1 of instruction 1 will be available by the time instruction 1 is received at the execution unit 107 or 108 since the execution unit 107 has sent a two clock preliminary valid signal with result tag 15. The two clock preliminary valid signal indicates future availability of execution result corresponding to the accompanying result tag.

The functional unit 261–264 is required when instructions are received at the execution unit 107. The scheduler 215 examines the busy signal line 272 in the control bus 114 to determine availability of the functional unit 263. If the busy signal line 272 is deasserted, the scheduler 215 determines that the functional unit 263 will be available when the instruction arrives at the execution unit 107. The functional units 261, 262 and 264 are pipelined and are available to accept an additional instruction during each clock cycle. Consequently, the scheduler 215 assumes functional units 261, 262 and 264 are available to accept an additional clock cycle during every clock cycle.

The write back port 160, 170 is required after completion of execution of instructions. The scheduler 215 determines the execution time of instructions based on the operation code of each of the instructions. The scheduler 215 examines the inhibit signal line 275–276 in the control bus 114 corresponding to the execution time determined. If the corresponding inhibit signal line 275–276 in the control bus 114 is deasserted, the scheduler 215 determines that the write back port 160 will be available for the instruction after completion of execution. Similarly, the scheduler 215 determines the availability of write back port 170 by examining the inhibit signal lines in the control bus 113 (not shown in figures).

The dispatch bus 111, 112 is required immediately after the scheduler 215 determines that the instruction is ready. The reservation station 105 uses the dispatch bus 111, 112 to dispatch the ready instructions to the execution unit 107, 108 respectively. The dispatch buses 111, 112 allow dispatch of only one instruction in one clock cycle. The scheduler 215 selects only one of the instructions for dispatch on each dispatch bus 111, 112 if more than one instruction has the other required resources available. Accordingly, the scheduler 215 determines availability of dispatch bus 111, 112 after determining availability of the other required resources.

FIG. 6 shows the fields of an entry 300 for storing each instruction in the storage unit 210 for one embodiment The instruction comprises up to three operands (only two operands 1 and 2 are shown) and operation code 320. The instruction valid field 310 indicates whether the entry 300 contains an instruction that is waiting to be scheduled for execution. One bit is used for instruction valid field 310. The instruction valid field 310 is set to a value of one if there is waiting instruction in the entry 300 and a zero otherwise. The front end unit 103 sets the instruction valid field 310 to one if an instruction is allocated the entry 300. The storage unit 210 resets the instruction valid bit 310 to zero once the instruction is dispatched for execution. A value of zero in the instruction valid field 310 clears the entry and makes the entry available for other instructions.

The entry 300 comprises an operation code field 320 and a result tag field 330. The result tag field 330 stores the result tag assigned to the destination register of the instruction by the front end unit 103. The operation code corresponding to the instruction is stored in the operation code field 320. Six bits are allocated to each of the operation code field 320 and result tag field 330.

The entry 300 comprises at least five fields corresponding to operand 1. The tag field 341 of operand 1 contains the result tag of the execution result that corresponds to operand 1. The valid field 342 indicates whether operand 1 is available. A value of one in the valid field 342 of operand 1 indicates that operand 1 is available and a 0 otherwise. If the valid field 342 is set to 1, operand 1 is stored in the operand field 343.

In the case of data dependent operands, operand 1 is the execution result corresponding to the result tag in the tag field 341. The valid field 342 is set according to the valid bit 470 of the physical register corresponding result tag in tag field 341. The storage unit 210 receives the valid bit 470 when the result buffer 106 sends data comprising execution result and valid field 470 over the result delivery bus 133. The result buffer 106 sends the data in response to result tag sent by the front end unit 103 over the result request bus 132.

The storage unit 210 also sets the valid field 342 to 1 once execution unit 107, 108 send the execution result corresponding to an operand over the write back bus 109, 110. The storage unit 210 bypasses the received operand into the instruction corresponding to entry 300 by storing the received execution result in the operand field 343.

The storage unit 210 sets the 2-clock preliminary valid field 344 of operand 1 to a value of one if the execution unit 107 or 108 sends a 2-clock preliminary valid signal with a result tag equal to the result tag stored in tag field 341. A value of 1 in the 2-clock preliminary valid field indicates that the execution unit 107 or 108 has predicted the availability of execution result corresponding to operand 1.

The storage unit 210 sets the 1-clock preliminary valid field 345 of operand 1 to a value of one if the storage unit 210 receives a one clock preliminary valid signal with a result tag equal to the result tag in tag field 341 from the prediction logic 230. The front end unit 103 sets the 2-clock preliminary valid field 344 and the 1-clock preliminary valid field 345 to a value of zero at the time of storing the instruction into the reservation station 105.

Similarly, the entry 300 comprises at least five fields corresponding to operand2. The tag field 351 stores the result tag of the execution result of a source instruction that corresponds to operand 2 if operand 2 is a data dependent instruction. The valid field 352 is set to 1 if operand 2 is available and 0 otherwise. If valid field 352 is set to 1, execution result corresponding to operand 2 is stored in the operand field 353. The storage unit 210 sets the 2-clock preliminary valid field 354 to 1 if one of the execution units 107, 108 sends a 2-clock preliminary valid signal with a result tag that matches the result tag in tag field 351. The storage unit 210 sets the 1-clock preliminary valid field 355 to one if the prediction logic 230 sends a 1-clock preliminary valid signal with a result tag that matches the result tag in the tag field 351.

Figure 7:
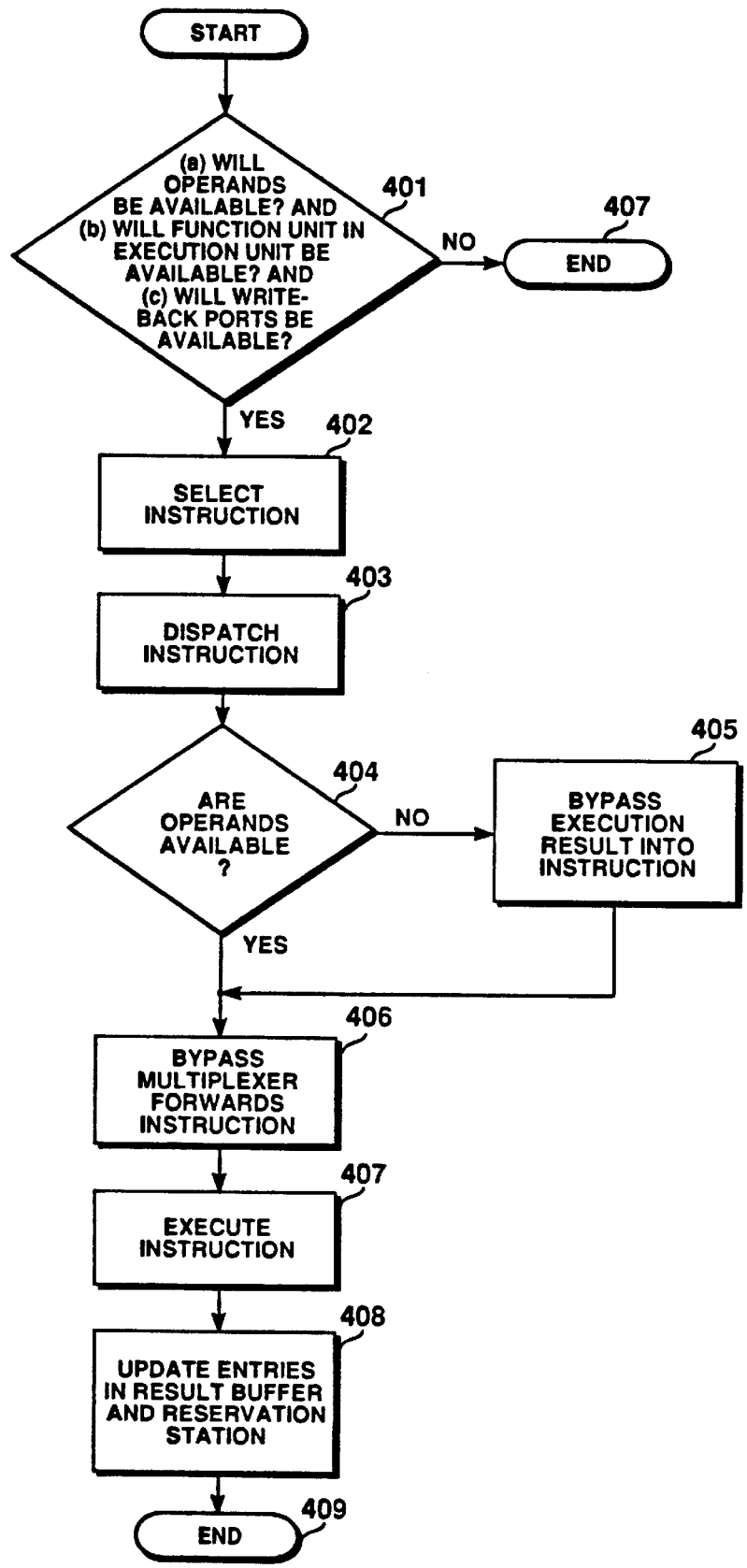
FIG. 7 is a flowchart illustrating the steps in scheduling and executing instructions in the computer system.

FIG. 7 is a flowchart illustrating high level steps in scheduling and executing instructions in processor 10 for one embodiment. In step 401(*a*), the scheduler 215 determines whether each instruction will have operands available by the time the instruction arrives at the execution unit. The scheduler 215 determines that an operand will be available either if the operand is available or if the future availability of execution result corresponding to the operand has been predicted. The scheduler 215 determines that operands 1 and 2 are available if the valid fields 342 and 352 respectively are set to one.

The scheduler 215 determines that operand 1 will be available by the time the instruction is received at the bypass multiplexor 115 or 116 if the 2-clock preliminary valid bit 344 or 1-clock preliminary valid bit 345 is set to 1. A value of one in the 2-clock preliminary valid bit 344 indicates that one of the execution units 107, 108 has sent a 2-clock preliminary valid signal indicating the future availability of the execution result that corresponds to the operand. A value of one in the 1-clock preliminary valid field 345 indicates that the prediction logic 230 has sent a 1-clock preliminary valid signal indicating the future availability of execution result corresponding to operand 1.

Similarly, the scheduler 215 determines that operand 2 corresponding to entry 300 will be available by the time the instruction is received at the bypass multiplexor 115 or 116 if the 2-clock preliminary valid bit 354 or the 1-clock preliminary valid bit 355 is set to 1.

In step 401(b), the scheduler 215 determines whether the functional unit 261–264 in the execution unit 107 corresponding to the operation code 320 of the instruction is available to execute the instruction corresponding to entry 300. The scheduler 215 determines that the functional unit 263 is not available if the busy signal line 272 in the control bus 114 corresponding to the functional unit 263 is asserted. For the other functional units 261, 262 and 264, the scheduler 215 determines that the functional unit available since the functional units are pipelines and are capable of receiving an additional instruction during each clock cycle. Similarly, the scheduler 215 examines the control bus 113 to determine the availability of functional units (not shown in diagrams) in the execution unit 108.

In step 401(c), the scheduler 215 determines whether the write back port 160 in the execution unit 107 will be available for the instruction corresponding to entry 300. The scheduler 215 determines that the write back port 160 is not available if the instruction inhibit signal line 275, 276 in the control bus 114 corresponding to the execution time of the instruction is asserted. The scheduler 215 determines the execution time of the instruction based on the operation code 320 of the instruction.

In step 402, the scheduler 215 selects one instruction per execution unit 107, 108 if more than one instruction is determined to have resources of step 401(a)–(c). The instructions with valid bits 342 and 352 set to one are given priority over the instructions with valid bit 352 or 342 set to zero. The scheduler 215 determines instruction corresponding to entry 300 is ready only if all the resources of steps 401(a)–(c) and 402 are available. The scheduler 215 processes the three steps 401(a)–(c) in parallel. The scheduler 215 schedules at most one ready instruction to each of the execution units 107, 108 for dispatch.

In step 403, the storage unit 210 dispatches the ready instructions to one of the bypass multiplexors 115 or 116 over the corresponding dispatch bus 111 or 112 respectively. To dispatch an instruction, the storage unit 210 accesses the entry 300 corresponding to the instructions and transfers the accessed data over the dispatch bus 111 or 112. The data sent with each instruction includes fields corresponding to the operation code 320, the result tag 330, and operands 1 and 2 (i.e. data in operand fields 343, 353).

In step 405, the reservation station 105 controls the operation of the bypass multiplexor 115 or 116 to bypass an execution result into the dispatched instruction if the dispatched instruction was determined ready based on prediction of future availability of the execution result. The scheduler bases the prediction on 2-clock preliminary valid field 344, 354 or the 1-clock preliminary valid field 345, 355 being set to 1. If both the operands are available (i.e. operand valid bits 342, 352 set to 1), the reservation station 105 does not cause the bypass multiplexors 115, 116 to bypass any execution result into the dispatched instruction.

In step 406, the multiplexor 115 (or 116) transfers instructions with fully assembled operands over the assembled instruction bus 121 (122) to the execution unit 107 (108). The steps 404, 405 and 406 consume one clock cycle.

In step 407, the execution unit 107, 108 begins executing received instructions. In step 408, once the execution of an instruction is complete, the execution unit 107, 108 writes the result tag and the corresponding execution result to the result buffer 106 over the write back bus 109 or 110 respectively.

The storage unit 210 receives the execution result and the result tag 330 over the snooping buses 119, 120. The storage unit 210 compares the result tag received with the tag 341, 351 of the data dependent operands in the storage unit 210. If a match is detected, the storage unit 210 stores the execution result received in the corresponding operand field 343, 353. A content addressable memory (CAM) is advantageously employed in the storage unit 210 for the comparison operation for superior performance.

Figure 8:
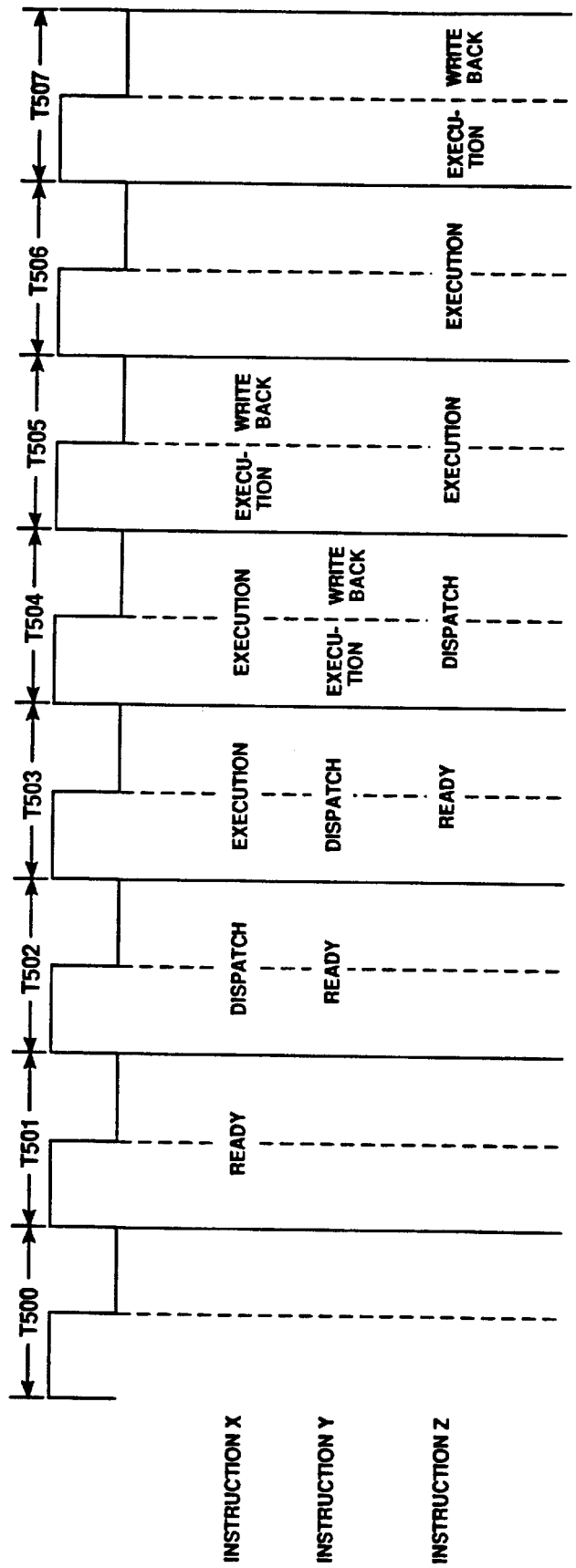
FIG. 8 is a timing diagram depicting the stages instructions propagate through if all the required resources for execution of the instructions are available.

FIG. 8 illustrates time consumed in different stages in the pipelined processor 50 for one embodiment. Instructions X, Y, and Z are assumed to have the other required resources available such that the scheduler 215 determines the instructions ready in successive clock cycles. For purposes of illustration, the three instructions are assumed to be executed on execution unit 107.

During clock cycle T501, the scheduler 215 determines that instruction X is ready for execution and can thus be scheduled for dispatch to the execution unit 107.

During the first phase of clock cycle T502, the storage unit 215 dispatches instruction X to the execution unit 107. Since instruction X has all the operands available, the bypass multiplexor 115 transfers instruction X to the execution unit 107 in the second phase of the clock cycle T502. Due to the pipelined nature of the processor 50, the scheduler 215 works on another instruction Y during the same clock cycle T502. During clock cycle T502, the scheduler 215 determines that instruction Y is ready for execution.

After receiving instruction X, the execution unit 107 begins executing instruction X during clock cycle T503. During the same clock cycle T503, the storage unit 210 dispatches instruction Y to the execution unit 107 according to determination in earlier clock cycle T502. The scheduler 215 further determines instruction Z is ready for dispatch during clock cycle T503.

During clock cycle T504, instruction X continues execution while instruction Y begins and ends execution in the first phase. In the second phase, the execution unit 107 transfers the execution result and the result tag to result buffer 106 over the write back bus 109.

The storage unit 210 receives the execution result and the result tag of instruction Y from the write back bus 109 over the snooping bus 120. The storage unit 210 compares the received result tag with the result tag of all operands stored in the result buffer 106. The storage unit 210 stores the received execution result in the operand field 343 or 353 corresponding to all matched result tag.

The execution of an instruction takes a different number of clock cycles depending on the operation code of the instruction. Thus, execution of instruction Y has completed though it has been scheduled later than instruction X. During clock cycle T504, the reservation station 105 is dispatches instruction Z to the execution unit 107.

During clock cycle T505, instruction X continues execution. The execution unit 107 writes back the execution result of instruction Y to the result buffer 106 over the write back bus 109 during the same clock cycle. The storage unit 215 receives the execution result and result tag of instruction Y over the snooping bus 120 from the write back bus 109. The storage unit 215 stores the execution result in the operand fields 343 or 353 of operands that correspond to the execution result. Instruction Z begins execution during clock cycle T505.

After completing execution of instruction Z, the execution unit 107 writes the execution result and result tag of instruction Z over the write back bus 109. The execution result is written back to the result buffer 106 and stored in the storage unit 210 similar to the execution result of instruction Y.

It is noted that each of the waiting instructions in the reservation station 105 requires at least two clock cycles before beginning execution in the execution unit 107 or 108. The two clock cycles comprise one clock cycle for scheduling and another clock cycle for dispatch.

In the illustration in FIG. 8, all the required resources of steps 401 and 402 in FIG. 7 are available for executing the instructions. Various aspects of the present invention are directed to scheduling instructions by indicating future availability of the required resources.

The step 401(b) of determining the functional unit availability includes functional unit arbitration. The step 401(c) of determining the write back port availability is accomplished by write back port arbitration scheme. The step 401(a) of determining the operands availability includes 1. Two clock look ahead Scheduling and 2. One Clock Look Ahead Scheduling.

Functional Unit Arbitration

As shown in step 401(b) of FIG. 6, the scheduler 215 ensures functional unit availability before dispatching an instruction to the corresponding execution unit 107, 108. For purposes of illustration, the functional unit arbitration is explained with reference to execution unit 107.

The execution unit 107 indicates non-availability of the floating point divide functional unit 263 to accept additional instructions by asserting the busy signal line 272 in the control bus 114. The scheduler 215 examines the busy signal 272 in determining floating point divide functional unit 263 availability. If the busy signal line 272 is asserted, the scheduler 215 determines that all floating point divide instructions that are assigned to execute on execution unit 107 are not ready. The scheduler 215 waits until the busy signal line 272 is deasserted prior to determining that any floating point divide instruction is ready.

In one embodiment, the functional unit 263 deasserts the busy signal line 272 two clock cycles prior to completion of an executing instruction. The two clock cycles correspond to the time required to schedule and dispatch waiting instructions in the storage unit 215.

In an alternate embodiment, the functional unit 263 deasserts the busy signal line 272 only after completing execution of an already executing instruction. Consequently, the corresponding functional unit 263 remains idle for two clock cycles prior to arrival of a waiting instruction from the reservation station 105.

Figure 9A:
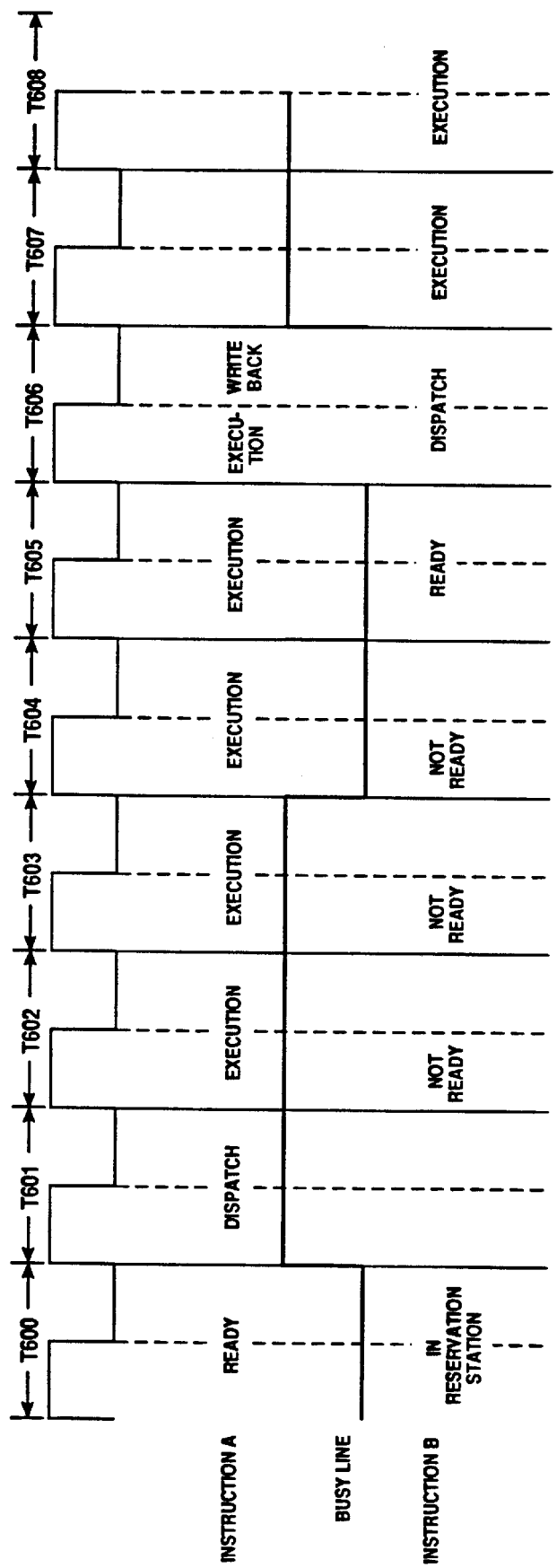
FIG. 9a is a timing diagram illustrating the scheduling of an instruction if an execution unit predicts availability of a functional unit a fixed number of clock cycles prior to availability.

FIG. 9a is a timing diagram that illustrates scheduling of two floating point divide instructions A and B wherein the functional unit 263 deasserts the busy signal line two clock cycles prior to completion of execution of an executing instruction.

During dock cycle T600, the scheduler 215 determines that the functional unit 263 is available to execute additional instructions since the control signal line 272 in the control bus 114 is deasserted. Accordingly, the scheduler 215 determines that instruction A is ready for execution if the other required resources to execute instruction A are available.

During clock cycle T601, the scheduler 215 dispatches instruction A to execution unit 107 that includes the floating point divide functional unit 263. The scheduler 215 does not determine additional floating point divide instructions ready if another floating point divide instruction is determined ready in a previous clock cycle. The scheduler 215 determines that instruction B is a floating point instruction based on the operation code of instruction B. Since the scheduler 215 has determined another instruction (i.e. A) ready in the previous clock cycle T600, the scheduler 215 determines instruction B is not ready for dispatch.

During clock cycle T602, instruction A starts execution during clock cycle T601. At the same time, the functional unit 263 asserts the busy signal line 272 to indicate non-availability for executing additional floating point divide instructions. Accordingly, the scheduler 215 determines that instruction B is not ready for dispatch.

Similarly, during clock cycle T603 and T604, the functional unit 263 continues to assert the busy signal line 272 and the scheduler 215 determines instruction B is not ready. During clock cycles T602–T604, the scheduler 215 examines the busy signal line 272 in the first phase of every dock cycle. Since the busy signal line 272 is asserted, the scheduler 215 determines that instruction B is not ready for execution.

By the end of clock cycle T604, the functional unit 263 predicts completion of the currently executing instruction A in two clock cycles, and deasserts the control line 272. During clock cycle T605, the scheduler 215 examines the control signal line 272 and determines that instruction B is ready provided all the other required resources are also available.

During clock cycle T606, the scheduler 215 dispatches instruction B to the execution unit 108. The instruction A completes execution during clock cycle T606 as earlier predicted. The execution of the instruction begins during clock cycle T607.

Figure 9B:
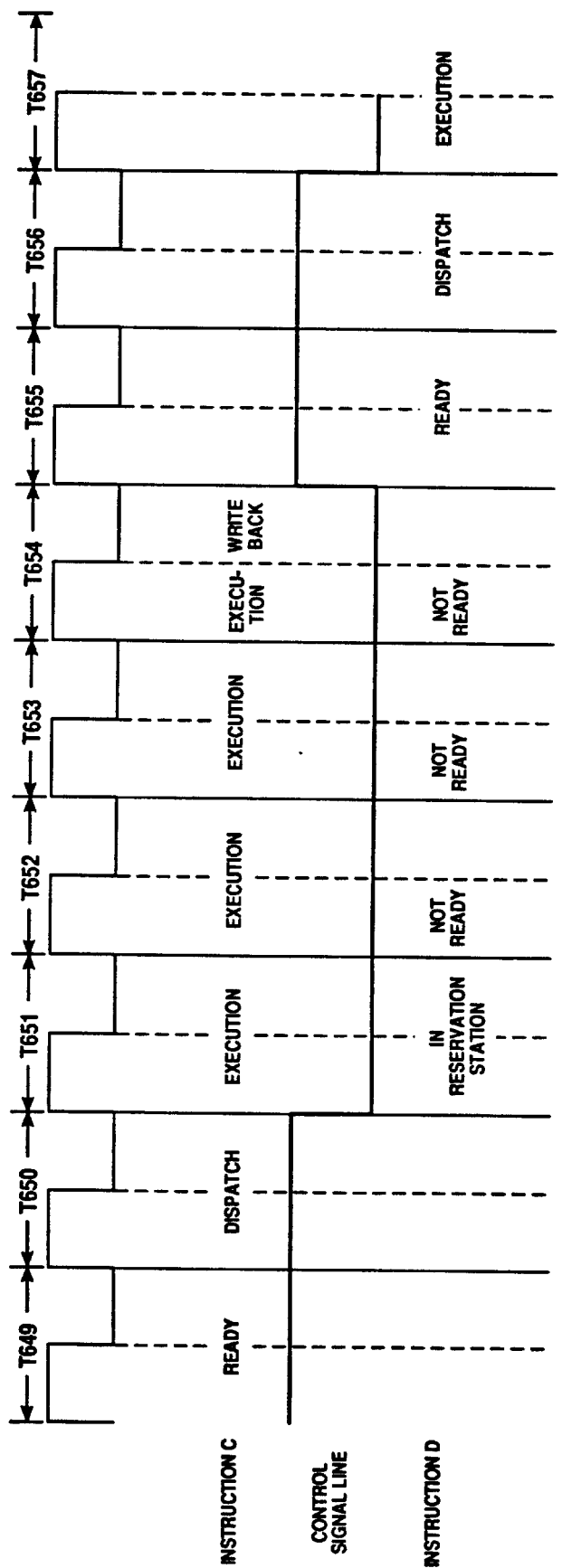
FIG. 9b is a timing diagram illustrating scheduling of an instruction if the execution waits until the end of execution of a currently executing instruction in a functional unit before permitting additional instructions to be scheduled to that functional unit.

FIG. 9b illustrates a timing diagram wherein an alternative embodiment of the execution unit 107 does not indicate completion of execution of an executing instruction. In this case, the functional unit 263 deasserts the busy signal line 272 after the completion of execution of an executing instruction.

During clock cycle T649, the scheduler 215 determines that a floating point divide instruction C is ready for dispatch. Accordingly, during clock cycle T650, the scheduler 215 dispatches instruction C to the execution unit 107. Also, the scheduler 215 refrains from determining ready additional floating point divide instructions during clock cycle T650 since the scheduler 215 has determined that another floating point divide instruction (C) is ready in a previous clock cycle T649. Accordingly, the scheduler 215 determines that instruction D is not ready for dispatch.

Instruction C begins execution in functional unit 263 during clock cycle T651. The functional unit 263 asserts the busy signal line 272 during the same clock cycle T651. The functional unit 263 does not predict completion of execution of instruction C. It takes four clock cycles to complete execution of instruction C. The functional unit 263 continues to assert the busy signaling 272 until clock cycle T655, when the write back of execution result of instruction C to the result buffer 106 is complete.

The scheduler 215 checks the busy signal line 272 in the first phase of each of the clock cycles T652, T653, T654 and T655 to determine whether the functional unit 263 is available. Since the functional unit 263 has asserted the corresponding busy signal line 272 until the end of clock cycle T654, the scheduler 215 determines the functional unit 263 is not available for executing additional instructions. Accordingly, the scheduler 215 determines that a floating point divide instruction D is not ready in each of the clock cycles T652, T652 and T654.

At the end of dock cycle T654, the functional unit 263 deasserts the busy signal line 272. The scheduler 215 examines the busy signal line 272 during clock cycle T655 and determines that the required functional unit 263 in execution unit 108 is available.

During dock cycle T657, the instruction D is dispatched to the functional unit 263. During clock cycle T658, the execution of the instruction begins. The functional unit 263 is idle for two clock cycles in T655 and T656. Thus, in an embodiment operative in accordance with FIG. 9b, the functional unit 263 is idle for the number of clock cycles required to schedule and dispatch an instruction in the reservation station 105.

Write back Port Arbitration

As shown in step 402(c) of FIG. 7, the scheduler 215 ensures that a write back port 160, 170 will be available for each instruction that completes execution in execution unit 107, 108 respectively. The scheduler 215 determines instructions are ready so as to avoid conflicts for the write back port 160, 170. The write back port arbitration is explained with reference to functional unit 261 in the execution unit 107.

During each clock cycle, the functional unit 261 asserts the one clock instruction inhibit signal line 275 if an instruction is executing in the stage 286 in that clock cycle. In response, the scheduler 215 does not schedule any instructions with an execution time of one clock cycle.

Similarly, the functional unit 261 asserts the two clock instruction inhibit signal line 276 if an instruction is executing in the stage 285. The scheduler 215 does not schedule any instructions with an execution time of two clock cycles in the clock cycles the two clock instruction inhibit signal line 276 is asserted.

The scheduler 215 avoids conflict for the write back port 160 by not scheduling instructions with execution time corresponding to the execution time of the inhibit lines that are asserted.

Figure 10:
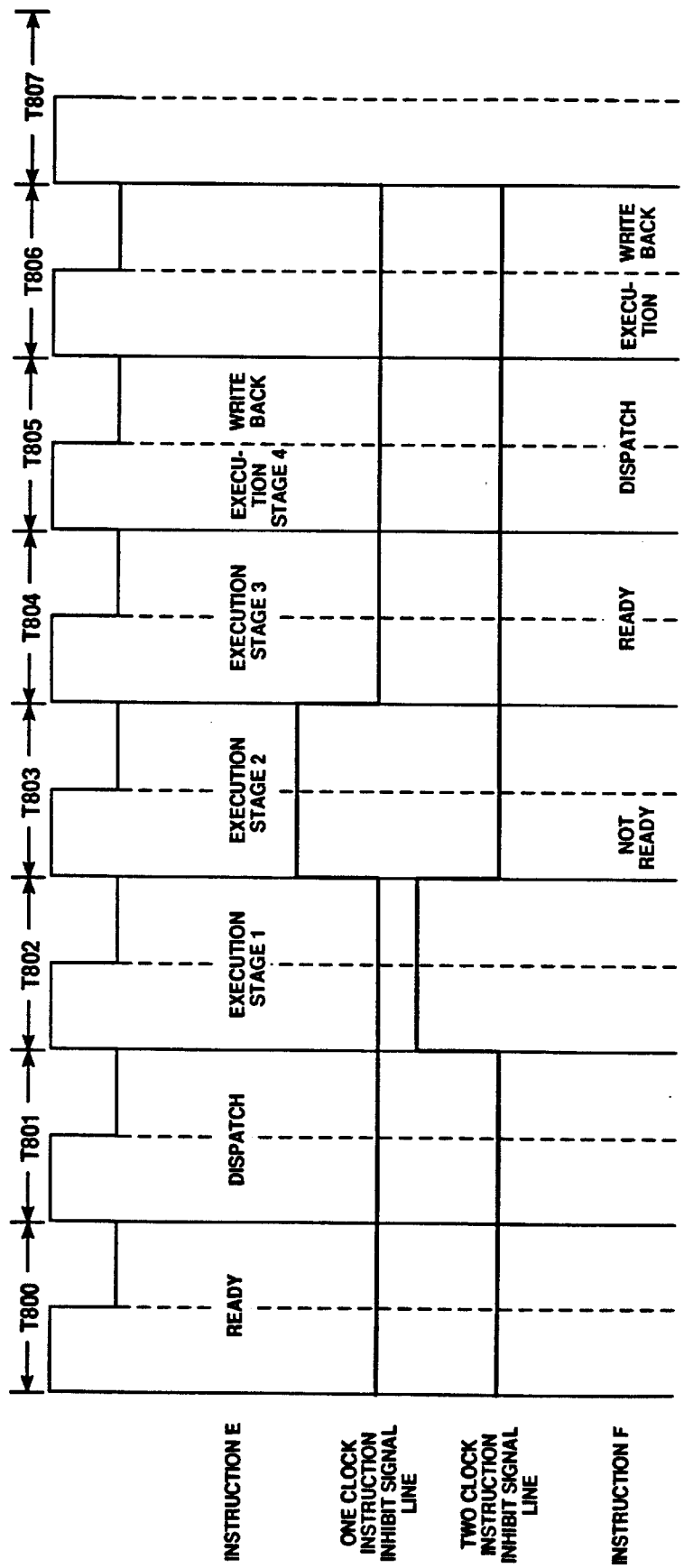
FIG. 10 is a timing diagram disclosing the steps in resolving the write back port conflicts using the instruction inhibit signals generated by the execution unit.

FIG. 10 illustrates the write back arbitration by way of a timing diagram. The scheduler 215 determines that a floating point multiplication instruction E in the storage unit 215 is ready during clock cycle T800. During clock cycle T801, the storage unit 215 dispatches instruction E to the functional unit 261 for execution. The instruction E is received at the latch 281 in front of the first stage 285 of the floating point multiplication functional unit 261.

During clock cycle T802, the functional unit 261 begins executing instruction F. The functional unit 261 asserts the two clock instruction inhibit signal line 276 since instruction E is executing in the stage 285 in the clock cycle T800. The functional unit 261 does not assert the one clock instruction inhibit signal line 275 since no instruction is executing in the stage 286.

During clock cycle T803, the instruction begins execution in the second stage 286. In the beginning of dock cycle T803, the second stage 286 asserts the inhibit signal line 275. The stage 285 deasserts the two clock instruction inhibit signal line 276 since no instruction is executing in the stage 285.

The scheduler 215 determines that the execution time of instruction F is one clock cycle based on the operation code 320 of instruction F. Because instruction F is to execute in execution unit 107 (which includes the functional units 261 and 262) with execution time of one clock cycle, the scheduler 215 examines the one-clock instruction inhibit signal 275 to determine the availability of the write back port 160 for instruction F. Since the one-clock instruction inhibit signal 275 is asserted, the scheduler 215 determines that instruction F is not ready for execution during clock cycle T803.

During clock cycle T804, the execution unit 107 deasserts the one-clock instruction inhibit line 275 provided second stage 286 is not processing a subsequent instruction in the pipeline. The scheduler 215 examines the one-clock instruction inhibit signal 275 again to determine if the write back port 160 will be available for instruction F after completion of execution. Since the one-clock instruction inhibit line 275 is not asserted, the scheduler 215 determines that instruction F will have the write back port 160 available. If all the other required resources are available, the scheduler 215 determines that instruction F is ready.

During the first phase of clock cycle T805, the floating point multiplication functional unit 261 completes executing instruction E. In the second phase of clock cycle T805, execution unit 107 writes the execution result of instruction E to the result buffer 106 over the write back bus 109. During the same clock cycle T805, the storage unit 210 dispatches the instruction F to the execution unit 107.

In the first phase of clock cycle T806, ALU 262 begins and completes executing the instruction F. In the second phase of the clock cycle T806, the ALU 262 writes back execution result of instruction F to the result buffer 106. Since the one-clock instruction inhibit signal line 275 is deasserted during clock cycle T804, i.e. three dock cycles earlier, the scheduler 215 avoids conflict for the write back port 160 between instructions E and F.

Operands' Availability

The resources required for executing an instruction include the operands of the instruction as shown in step 401(a) of FIG. 7. The operands are required by the time an instruction begins execution at one of the execution units 107, 108. The scheduler 215 determines whether operands 1, 2 are available by examining the corresponding valid bits 342 and 352. If the valid fields 342 and 352 are set to 1, the operands 1 and 2 are available.

The scheduler 215 determines that an instruction will have the required operands available by the time the instruction begins execution using two clock look ahead scheduling scheme or one clock look ahead scheduling scheme described below.

Figure 11:
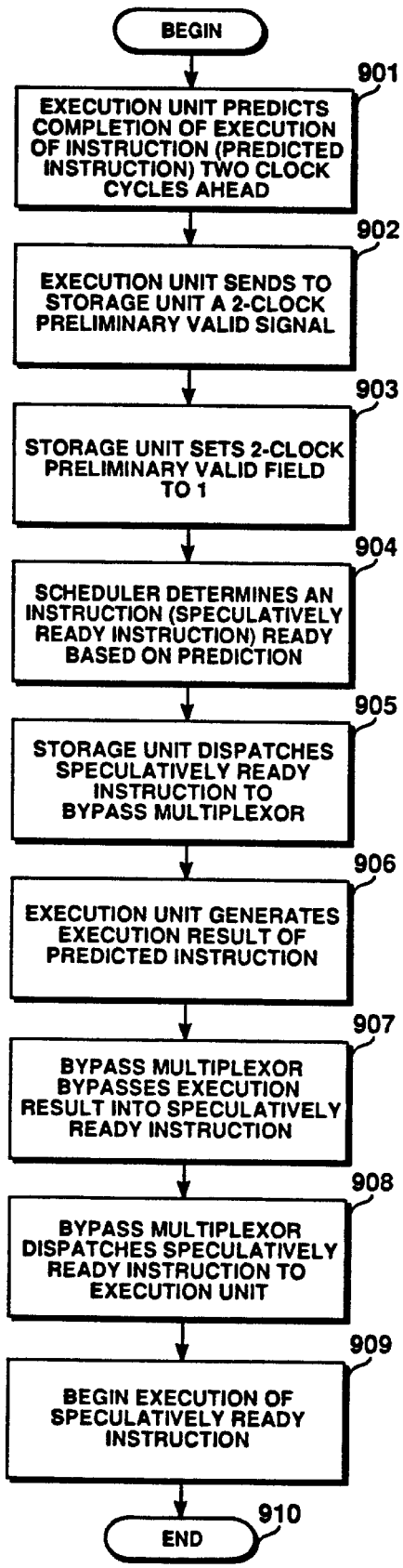
FIG. 11 is a flow-chart illustrating the steps in two dock look ahead scheduling wherein the execution unit predicts future availability of an execution result of a currently executing instruction and the scheduler determines ready a data dependent instruction requiring the execution result.

FIG. 11 illustrates the steps in two clock look ahead scheduling by means of a flow-chart for one embodiment. For purposes of explanation it will be assumed that execution unit 107 indicates future completion of a nearly completed executing instruction, and that execution unit 107 executes another instruction that is determined ready based on the indication.

In step 901, execution unit 107 predicts that an instruction (hereinafter "predicted instruction") will complete execution in two clock cycles from a present clock cycle. In step 902, the execution unit 107 sends to the storage unit 210 a 2-clock preliminary valid signal with the result tag of the execution result of the predicted instruction.

In step 903, the storage unit 210 receives the preliminary valid signal along with the result tag. The storage unit 210 compares the received result tag with the result tag fields 341 and 351 of all operands in the storage unit 210. The storage unit 210 sets the 2-clock-preliminary valid bit 344 (or 354) of operands whose result tag field 341 (351) matches the result tag received with the 2-clock preliminary valid signal to a value of 1.

In step 904, the scheduler 215 determines ready an instruction (hereinafter "speculatively scheduled instruction") which has all the other required resources except an operand whose 2-clock-preliminary valid bit 344 or 354 has been set to 1 in step 903.

In step 905, the storage unit 210 dispatches the speculatively scheduled instruction to the bypass multiplexor 115 over the dispatch bus 111 since the speculatively dispatched instruction is assumed to be assigned to execute on execution unit 107.

In step 906, the execution unit 107 completes execution of the predicted instruction and sends the execution result over the write back bus 109. In step 907, the bypass multiplexor 115 bypasses the execution result of the predicted instruction into the speculatively scheduled instruction under the control of the reservation station 105.

In step 908, the bypass multiplexor 115 sends the speculatively scheduled instruction with fully assembled operands to the execution unit 107. In step 909, the execution unit 107 begins execution of the speculatively scheduled instruction.

Figure 12:
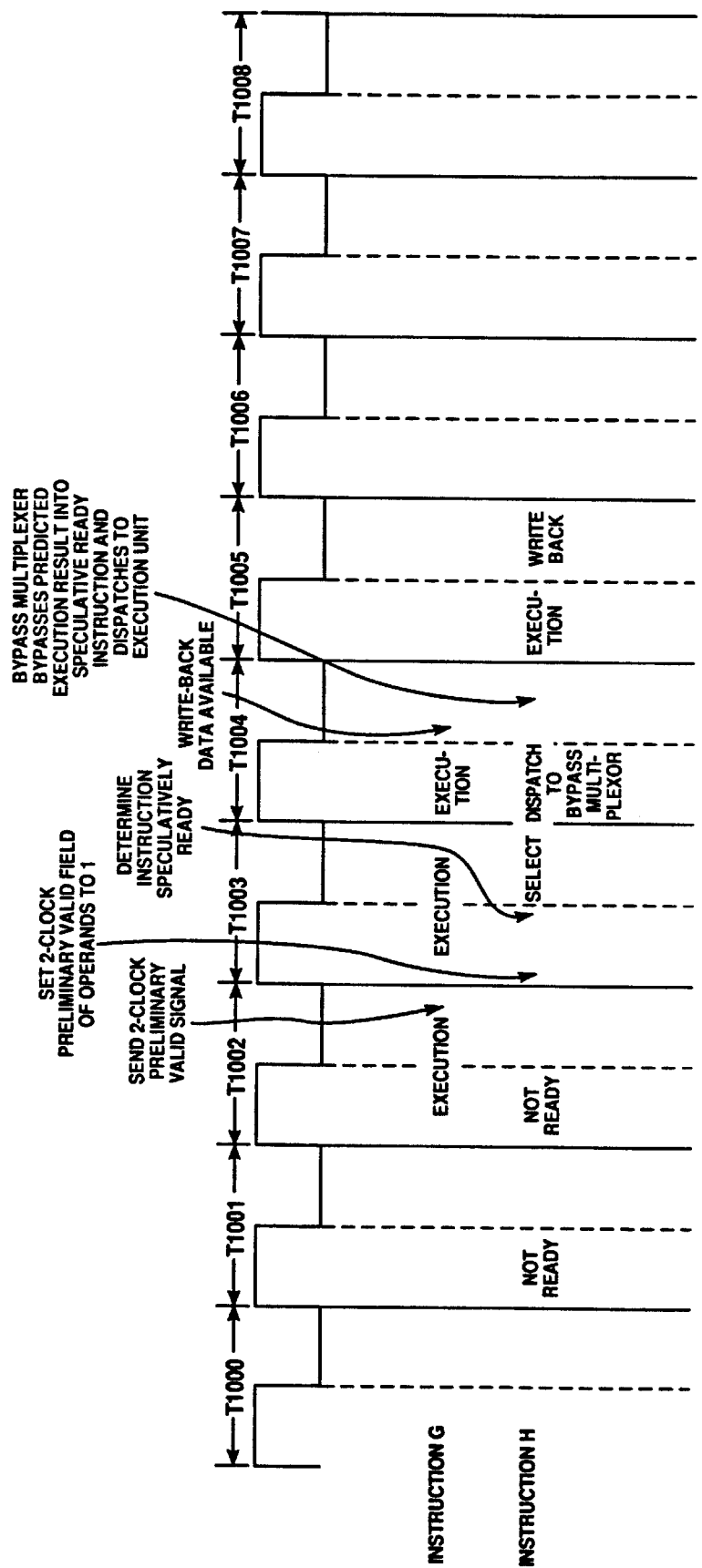
FIG. 12 is a timing diagram of various stages of execution of two instructions in one clock look ahead scheduling.

FIG. 12 is a timing diagram illustrating two clock look ahead scheduling in accordance with the method shown in the flowchart of FIG. 11. The execution result of instruction G provides an operand for the data dependent instruction H.

During clock cycle T1000, execution unit 107 is shown to be executing instruction G. The instruction H is in the storage unit 210 waiting for the execution result of instruction G. For purposes of illustration, it is assumed that instruction H has available all the required resources except execution result of instruction G.

During the second phase of clock cycle T1002, the execution unit 107 predicts that the execution result of instruction G will be written back on the write back bus 109 in two clock cycles i.e. during the second phase of clock cycle T1004. Accordingly, the execution unit 107 sends a two-clock preliminary valid signal to the storage unit 210 along with the result tag of execution result of instruction G.

The storage unit 210 compares the result tag received from the execution unit 107 with the result tag in the tag fields 341 and 351 of all the operands in the storage unit 210. Since the execution result of the instruction G corresponds to an operand of instruction H, the tag field 341 or 351 of instruction H will have the same result tag as the instruction tag of instruction G. On detecting a match with tag of one of operands of instruction H, the storage unit 210 sets the corresponding two-clock-preliminary-valid field 344 or 354 of the matched operand to 1.

During clock cycle T1003, the execution unit 107 continues executing instruction G. The scheduler 215 examines the two-clock-preliminary valid bit 344 or 354 of the operands of instruction H and finds that one of the two two-clock-preliminary valid bits 344, 354 is set to 1. If all the required resources except the operand with the two-clock-preliminary-valid bit set to 1 are available, the scheduler 215 determines that the instruction H is ready for execution.

During the first phase of clock cycle T1004, the storage unit 210 dispatches instruction H over the dispatch bus 112 to bypass multiplexor 116. The execution unit 107 completes execution of instruction G.

During the second phase of clock cycle T1004, the execution unit 107 writes back the execution result of instruction G over the write back bus 109. The reservation station 105 causes the bypass multiplexor 116 to bypass the execution result on the write back bus 109 into instruction H using the snooping bus 118 (that couples to the write back bus 109). The bypass multiplexor 116 then sends instruction H with fully assembled operands to the execution unit 108 over the assembled instruction dispatch bus 122.

During dock cycle T1005, the execution unit 108 begins executing instruction H. The instruction H completes execution in the first phase of the clock cycle and writes back the execution result to result buffer 106 in the second phase of clock cycle T1005.

Figure 13:
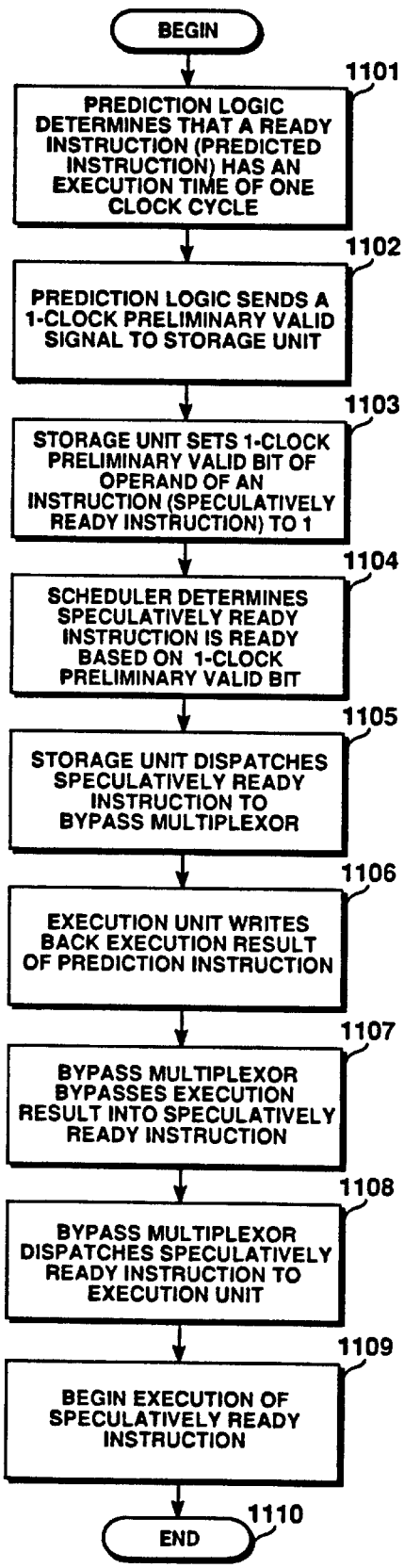
FIG. 13 is a flow-chart showing the steps in one clock look ahead scheduling wherein the prediction logic predicts future availability of an execution result of a ready instruction and the scheduler determines ready a data dependent instruction requiring the execution result.

FIG. 13 is a flowchart illustrating a method of scheduling instructions using the one-clock look ahead scheme, wherein instructions are scheduled for execution in back-to-back clock cycles. In step 1101, the prediction logic 230 examines all the ready instructions to determine whether any ready instruction ("predicted instruction") has an execution time of one clock cycle. In step 1102, the prediction logic 230 sends a one clock preliminary valid signal with result tag of each predicted instruction to the storage unit 210 over the bus 237.

In step 1103, the storage unit 210 receives the result tag, and compares the received result tag with the operand tag fields 341 and 351 of all the operands in the storage unit 210. If a match is detected, the storage unit 210 sets the one-clock preliminary valid bit 345 or 355 of the matched operand to a value of 1. The storage unit 210 dispatches the predicted instruction to the appropriate execution unit (assume 107) over the dispatch bus 111 for execution.

In step 1104, the scheduler 215 determines ready a data dependent instruction (herein after "speculatively scheduled instruction") which has available all the resources except one operand with one-clock preliminary valid bit 345 or 355 set to 1.

In step 1105, the storage unit 210 dispatches the speculatively scheduled instruction to the bypass multiplexor 115 over the dispatch bus 112 since the instruction is to execute in the execution unit 107. In step 1106, the execution unit 108 completes executing the predicted instruction, and writes back the execution result and the result tag over the write-back bus 109.

In step 1107, the bypass multiplexor 116 receives the speculatively scheduled instruction, and bypasses the execution result of the predicted instruction into the speculatively scheduled instruction using the snooping bus 118 under the control of the reservation station 105.

In step 1108, the bypass multiplexor 115 sends the speculatively scheduled instruction with fully assembled operands to the execution unit 108. The execution unit 108 begins executing speculatively scheduled instruction in step 1109.

Figure 14:
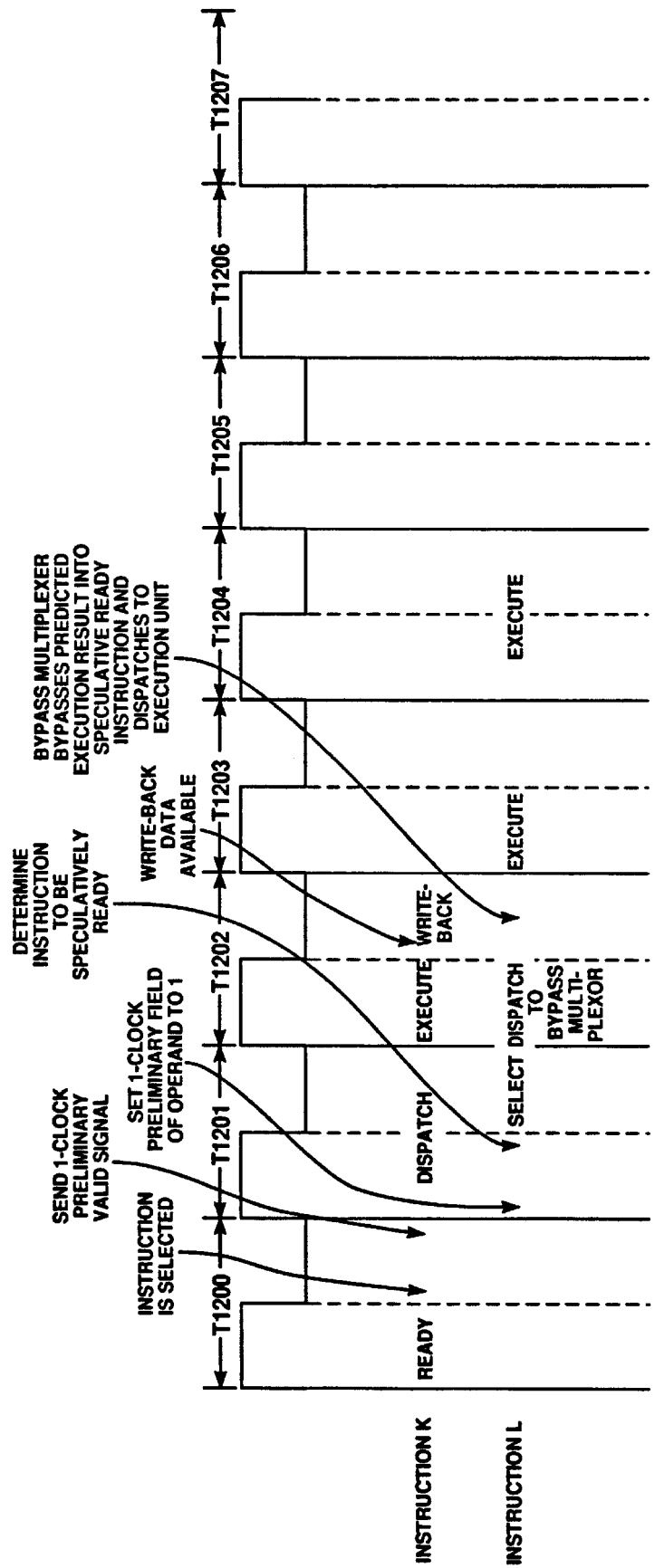
FIG. 14 is a timing diagram of various stages of execution of two instructions in one clock look ahead scheduling.

FIG. 14 shows the timing diagram of execution of data dependent instructions in accordance with the one-clock look ahead scheduling scheme for one embodiment. One of the operands of instruction L is the execution result of instruction K. For purposes of illustration, it is assumed that instruction K is to execute in execution unit 108 and instruction L in execution unit 107.

During clock cycle T1200, the scheduler 215 determines that instruction K is ready for execution. Before the end of clock cycle T1200, the prediction logic 230 determines that execution time of instruction K is one clock cycle by examining the operation code 320 of instruction K. The prediction logic 230 sends a one clock preliminary valid signal with the result tag 330 of instruction K to the storage unit 210 over the bus 237.

During clock cycle T1201, the storage unit 210 receives the one clock preliminary valid signal with the result of instruction K over the bus 237, compares the received result tag against the tag fields 341, 351 of operands of all instructions in the storage unit 210. The storage unit 210 sets the one-clock preliminary valid bit 345 or 346 of all the matched operands (including one of the operands of instruction L) to a 1. Subsequently, the scheduler 215 determines that instruction L is ready (assuming all the other required resources are available). In parallel, the storage unit 210 dispatches instruction K to the execution unit 108 over the dispatch bus 112.

During the first phase of clock cycle T1202, the execution unit begins and completes execution of instruction K. The storage unit dispatches instruction L to bypass multiplexor 115 over the dispatch bus 111.

During the second phase of clock cycle T1202, the execution unit 108 writes the execution result and instruction tag of instruction K over the write back bus 110. The bypass multiplexor 115 bypasses the execution result on the write back bus 110 into instruction L using the snooping bus 117 under the control of the reservation station 105. The bypass results in instruction L having fully assembled operands. The bypass multiplexor 115 dispatches instruction L with fully assembled operands to the execution unit 108 during the same clock cycle. During clock cycle T1203, instruction L begins execution.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative than a restrictive sense.

What we claim is:

1. A method of instruction execution in a processor, said method comprising the steps of:

generating an indication of availability of an execution result of a first instruction, completion of execution of said first instruction generating said execution result;

generating an n-cycle inhibit signal when completion of said first instruction will take more than n cycles;

determining whether said execution result provides an operand for a second instruction; and dispatching said second instruction to an execution unit through a bypass multiplexor prior to completion of execution of said first instruction if said execution result provides said operand for said second instruction and said n-cycle inhibit signal is not asserted, said dispatching step being performed according to said indication of availability such that said execution result is generated before said second instruction is received at said execution unit.

2. The method of claim 1 further comprising the steps of:

completing execution of said first instruction to generate said execution result;

bypassing said execution result into said bypass multiplexor with said dispatched second instruction; and executing said second instruction in said execution unit.

3. The method of claim 2 wherein said step of generating an indication of availability comprises sending a result tag of said first instruction, said result tag identifying a destination register for storing said execution result.

4. The method of claim 3 wherein said step of generating an indication of availability is performed by said execution unit executing said first instruction.

5. The method of claim 1 further comprising the step of buffering said second instruction before said step of generating an indication.

6. The method of claim 5 wherein said step of generating an indication of availability further comprises the steps of:

determining if said first instruction is ready for execution;

determining an execution time of said first instruction; and indicating future completion of execution of said first instruction according to said execution time, said step of indicating future completion sending said indication.

7. The method of claim 6 further comprising the steps of:

completing execution of said first instruction to generate said execution result;

bypassing said execution result into said dispatched second instruction; and executing said second instruction in said execution unit.

* * * * *

UNITED STATES PATENT AND TRADEMARK OFFICE
CERTIFICATE OF CORRECTION

PATENT NO.    : 5,842,036
DATED         : November 24, 1998
INVENTOR(S)   : Hinton et al.

It is certified that error appears in the above-identified patent and that said Letters Patent is hereby corrected as shown below:

Column 3,
Line 45, delete "dock" and insert -- clock --.

Column 4,
Line 54, delete "dock" and insert -- clock --.

Column 13,
Line 33, after "embodiment" insert -- . --.

Column 19,
Line 48, delete "dock" and insert -- clock --.

Column 20,
Line 20, delete "dock" and insert -- clock --.

Column 21,
Line 59, delete "dock" and insert -- clock --.

Signed and Sealed this

Thirteenth Day of May, 2003

JAMES E. ROGAN
*Director of the United States Patent and Trademark Office*